United States Patent [19]

Rickard

[11] Patent Number: 5,103,578
[45] Date of Patent: Apr. 14, 1992

[54] METHOD AND APPARATUS FOR REMOVING VOLATILE ORGANIC COMPOUNDS FROM SOILS

[76] Inventor: Robert S. Rickard, 9025 Blue Mountain Dr., Golden, Colo. 80403

[21] Appl. No.: 675,438

[22] Filed: Mar. 26, 1991

[51] Int. Cl.[5] ............................................. F26B 13/30
[52] U.S. Cl. ................................................ 34/92; 34/15; 110/236; 110/346; 432/205
[58] Field of Search ............... 110/226, 236, 349, 346; 432/152, 200, 205, 13, 18, 23; 134/21, 105, 107; 34/15, 79, 92

[56] References Cited

U.S. PATENT DOCUMENTS

| | | | |
|---|---|---|---|
| 4,436,344 | 3/1984 | Forgac | 299/2 |
| 4,454,915 | 6/1984 | York et al. | 166/259 |
| 4,511,434 | 4/1985 | Vasalos | 202/99 |
| 4,532,991 | 8/1985 | Hoekstra | 66/261 |
| 4,548,702 | 10/1985 | York et al. | 208/11 |
| 4,552,214 | 11/1985 | Forgac | 166/259 |
| 4,606,774 | 8/1986 | Morris | 134/10 |
| 4,611,469 | 9/1986 | Musschoot | 34/92 X |
| 4,667,609 | 5/1987 | Hardison et al. | 110/236 |
| 4,700,638 | 10/1987 | Przewalski | 110/346 |
| 4,783,263 | 11/1988 | Trost et al. | 210/638 |
| 4,815,398 | 3/1989 | Keating et al. | 110/233 |
| 4,848,460 | 7/1989 | Johnson | 166/245 |
| 4,864,942 | 9/1989 | Fochtman | 110/226 |
| 4,886,001 | 12/1989 | Chang et al. | 110/346 |
| 4,913,771 | 4/1990 | McIntyre | 34/92 X |
| 4,940,519 | 7/1990 | Dames | 204/130 |
| 4,998,486 | 3/1991 | Dighe et al. | 110/236 X |
| 5,020,452 | 6/1991 | Rybak | 110/236 X |

Primary Examiner—Edward G. Favors

[57] ABSTRACT

Volatile compounds such as polychlorinated biphenyls (PCB's) which contaminate a soil can be removed—without incineration—by a process which generally involves: (1) introducing the contaminated soil into a vessel, (2) heating the soil to a temperature greater than about 300° F., but less than 600° F., preferably in the presence of an inert gas, (3) drawing a vacuum on the vessel to such a degree as to cause the contaminant to flash to a contaminant vapor and (4) condensing the contaminate vapor to a liquid and (5) disposing of said liquid.

42 Claims, 2 Drawing Sheets

METHOD AND APPARATUS FOR REMOVING VOLATILE ORGANIC COMPOUNDS FROM SOILS

BACKGROUND OF THE INVENTION

1. Field of the Invention

The present invention generally relates to processes for removing toxic, hazardous or otherwise undesirable volatile organic compounds from soils, clays, sediments, sludges and the like. More particularly, this invention is concerned with processes for removing such volatile organic compounds from soils, etc., without employing incineration conditions.

2. Description of the Prior Art

Until recent times, relatively little attention has been paid to the public health consequences of introducing industrial wastes such as halogenated organic compounds into the environment. However, as man's understanding of the hazards associated with such compounds has grown, a body of stringent federal regulations has evolved to regulate their disposition. Such regulations also mandate the removal of these compounds, down to certain maximum permissible residual levels, from the soils of former disposal sites.

Cleanup operations of these sites are, however, very costly as well as technically difficult. They often involve the transportation of large volumes of contaminated soils, sludges, sediments etc. to specially designated and/or designed disposal areas or to specially designed and very strictly regulated incineration facilities. Obviously, the transportation of large volumes of contaminated soils, especially over relatively long distances, is an extremely expensive undertaking. In fact, transportation costs usually constitute the most significant cost factor in cleanup operations of this type. This cost factor is very frequently exacerbated by the fact that equally large volumes of uncontaminated soil must be brought from distant locations to replace the contaminated soil excavated from the cleanup site. Furthermore, the EPA has announced a five year goal of severely limiting and/or closing most hazardous waste landfills. The EPA has also announced its intention to more stringently regulate incineration of soils contaminated by organic chemicals in general and halogenated organic compounds in particular. Hence, the coming generation of incineration facilities will tend to become more technically complex and/or much more expensive to build and operate.

In response to these considerations, smaller, even portable, incineration systems have been proposed. For example, U.S. Pat. No. 4,667,609 discloses a mobile apparatus for infrared heating of soils contaminated by various hydrocarbons. The apparatus employed is provided with rotary seals to enable a slight negative pressure to be maintained in its furnace in order to prevent gaseous contaminants from leaking out to the atmosphere. Its heating step is however carried out to the point of complete combustion. Hence, its operation may be governed by certain federal regulations concerned with incineration of such materials. Similarly, U.S. Pat. No. 4,700,638 teaches a process wherein PCB's, dioxins, etc. are volatilized from soil at 350°-500° C. in order to avoid formation of glaze from certain low-melting soil constituents. Gases and mineral dust are removed by gas flow created by a fan and the resulting gases are combusted at high temperatures which may likewise invoke application of "incineration" regulations.

These regulations have their genesis in the fact that in many cases, small scale, local incineration—in spite of the best intentions and precautions—may well lead to air pollution problems which are even more pernicious than the original soil contamination problem being addressed. Not the least of these is the fact that incineration of certain halogenated organic chemical contaminants in the presence of water, oxygen and/or fixed nitrogen compounds can lead to the formation of various compounds (e.g., furans) which are known to be extremely toxic. Consequently, a number of alternative cleanup methods have been proposed which are intended to minimize transport costs and to completely eschew "incineration", as that term is defined by federal regulations, as a process step in any program for disposing of organic compounds in general and halogenated organic hydrocarbons in particular.

One such alternative to local incineration is embodied in the process taught by U.S. Pat. No. 4,574,013. It is based upon a concurrent reaction of an alkali metal hydroxide with an alcohol to form an alkoxide and water. The alkoxide is then reacted with a halogenated organic chemical contaminant to form an ether and a salt. The ether decomposes to a phenol which is then reacted with an alkoxide to form a soluble phenate. However, aside from the high cost of the chemical ingredients needed to carry out this process, as well as the complexities implied in its many process steps, this process is also greatly hampered by the fact that any water present in the feedstock will seriously interfere with the overall chemical reaction scheme. Consequently, the contaminated soil must first be thoroughly dried, at considerable expense before it undergoes this decontamination process.

U.S. Pat. No. 4,864,942 (the "942 patent") teaches a method for removing volatile organic compounds such as PCB's from soils by volatilizing said organic compounds at temperatures below those which federal regulations define as "incineration." This volatilization is induced by use of heat alone and is conducted in conjunction with continuous removal and condensation of any evolved vapors. The chief process vessel employed in process of the '942 patent is an indirectly heated rotary furnace which is operated at a very slight vacuum (i.e., a negative guage pressure from 0.1 to 2.0 inches of water column) in order to prevent vapor leakage into the atmosphere. This process has many virtues over others found in the prior art, but it also has one major drawback. The time periods necessary for it to effect complete volatilization of many high boiling point halogenated organic compounds are generally at least an hour. More often the process takes several hours, given the legal constraint to operate the device at relatively low temperatures less than 600° F. Nonetheless, the '942 patent does disclose some technical insights which are also useful in describing, and in differentiating, applicant's invention; therefore, the 942 patent is incorporated by reference into applicant's patent disclosure.

For example, the 942 patent clearly notes that there are many "gaps" in man's knowledge of how liquids are released from solid inert materials such as soils. It notes that the "mechanism" by which complex materials (such as contaminated soils) are dried—so that substantially all liquid contaminants are removed—is indeed complex and by no means completely understood. This reference also points out that the technological phenomena believed to be involved are generally those disclosed in certain other recognized references such as: Paris, *Physical Chemists Handbook,* Section 21, which also is incorporated by reference into this patent disclosure. For example, it has been postulated that factors such as the structure of the solids in a given inert material, the type of liquid contaminant(s), the presence or absence of other liquids in the inert material, the concentration of liquid contaminant(s), and the saturation of the gas phase may all, simultaneously, influence the mechanism by which internal liquids flow through, and vaporize from, a given inert material. Moreover, such liquid flow mechanisms can be further influenced by such factors as: (1) diffusion, (2) capillary flow, (3) flow caused by shrinkage and pressure gradients, (4) flow caused by gravity and (5) flow caused by the applicable vaporization, condensation, sequence.

This all goes to say that the process of removing even one liquid chemical species from an inert, solid material is complex and rarely occurs as a single continuous process. Processes for removing mixtures of different chemical species are even more complex. In most cases all such processes will involve a number of distinct, stage-wise, phases. For example, a first phase in drying a soil, sludge, sediment, etc. (hereinafter referred to as "earth material(s)") generally will involve evaporation of liquids, which may be contaminants, water, or other liquids, from the saturated surface on the earth material. This is usually followed by a period of evaporation from a saturated surface of gradually decreasing area and, finally, when the surface of the earth material is no longer saturated, transition to a period of evaporation from the interior of a solid form of the earth material.

Hence, drying rates also will vary with the relative volatility of the contaminant(s), temperature, time, solids composition, and moisture content of the earth material being dried. The 942 patent also notes that a plot comparing vapor evolution versus time, will often indicate several distinct phases. For example, there is usually a first phase of gradually increasing evolution of vapors as a contaminated solid material warms up. A second phase, known as the constant-rate phase, corresponds to the period in which a constant amount of vapor is evolved. The constant-rate phase, in turn, continues until a point at which the rate of drying begins to fall. This is often referred to as the point at which a "critical-moisture" content point is reached. After reaching this critical-moisture content point, the next phase is often called the "falling-rate" phase. This phase is typified by a continuously changing rate throughout the remainder of the drying cycle which corresponds to a decrease in saturated surface area. The next distinct point in such a curve occurs at that point at which all the exposed surfaces become completely unsaturated. This marks the start of the portion of the drying cycle during which the rate of internal moisture movement controls the drying rate.

Again, the drying rate also depends on certain factors affecting the diffusion of moisture away from the evaporating surface and those affecting the rate of internal moisture movement. Moisture which is held in the interstices of solids, or held as a liquid on the surface, or is held as free moisture in cell cavities, moves by gravity and capillary flow, provided that passageways for continuous flow are present. Moisture may move by vapor diffusion through the solid material, provided that a temperature gradient is established by heating, to create a vapor pressure gradient. Vaporization and vapor diffusion may occur in any such solid material in which heating takes place from one direction, drying from the other, and in which liquid is isolated between or inside granules of solid.

In the terminal phase, during which mass transfer takes place primarily by molecular, rather than eddy diffusion, the drying rate is mostly governed by the rate of internal moisture movement as the influence of external variables diminishes. This period usually predominates in determining the overall drying time to some lower moisture content. Moreover, in those processes (such as the one disclosed in the 942 patent) which are carried out as a "continuous process", it should be noted that all of the above processes are occurring at the same time. It also should be specifically noted that the 942 patent does not teach or suggest that—at the high vacuum levels needed to quickly vaporize relatively non-volatile contaminants (e.g., PCB's) to levels at or below certain maximum permissible residual concentrations (e.g., 2 ppm for PCB's)—there exist certain discontinuities in vaporization which can be utilized to expedite decontamination processes conducted at temperatures lower than those which legally defined "incineration."

It also should be noted that the 942 patent notes that an inert gas such as nitrogen, carbon dioxide, argon, etc., may be passed through such drying materials in order to reduce the partial pressure of the evolved vapors. In this way, the concentration of evolved vapors in the gas phase around the drying solid can be lowered, thereby making it easier for the heated liquids to pass from the liquid phase into the bulk of the vapor phase. Gases serving this purpose are often referred to as "sweep" or "sweeping" or "stripping" gases.

Finally, it should also be noted that the prior art has long recognized that as water residing in the interstitial spaces of a solid material vaporizes and goes into the vapor phase, it may carry certain contaminants along with it or otherwise facilitate the vaporization of such contaminants, e.g., by conditioning the gas phase to lower the vapor pressure at which the contaminants will pass into the vapor phase. It is also well known that even though the largest portion of water present in the inert solid vaporizes at around the saturation temperature of water, some water nevertheless goes into the vapor phase together with certain low boiling organics, and that residual water may still remain to be vaporized even in an inert solid which has been heated to a temperature above the boiling point of water. Hence, water may well play a significant role in increasing the effectiveness of a given decontamination process throughout a very broad range of temperature and pressure conditions which lie beyond the nominal boiling point of water at the overall total pressure prevailing.

SUMMARY OF THE INVENTION

In its broadest terms, this invention provides a process for separating liquid, that is to say "volatizable", organic and/or inorganic industrial wastes such as liquid bromine, volatile mineral acids, halogenated inorganic liquids, halogenated hydrocarbons, e.g., halogenated aromatics, certain organic solvents, PCB's and the like, from certain solid, earth-like, materials such as soils, sediments, sludges and the like ("earth materials"). This process is particularly characterized by the fact that it employs temperatures below the 600° F. temperatures at which "incineration" is defined by various federal environmental regulations. The process generally involves: (1) exposure of contaminated soils to certain hereinafter described temperature and vacuum conditions, usually on a batchwise basis, to form vapors of the contaminant, (2) collection of the contaminant in a concentrated liquid state for disposal purposes and (3) return of the decontaminated soil to the general site from which it was excavated. The most distinctive feature of the herein disclosed process, vis-a-vis the prior art as exemplified by the 942 patent, is the fact that it is carried out under strong vacuum conditions, e.g., from about 5μ (microns) Hg to about 400 mm Hg at temperatures ranging from about 300° F. up to 600° F. The total apparatus needed to carry out this process is relatively small and can be readily mounted on trucks, trailers, barges and the like. Thus, the process is especially well suited to relatively small scale cleanup operations in remote areas where permanent installations cannot be justified for practical and/or economic reasons.

Most preferably, any organic compound decontamination phase of this process is carried out in the absence of water so as to minimize possibilities for formation of toxic substances such as dioxins, dibenzofurans, etc. With respect to the subject of the presence of "water" in this process, it also should be noted that if steam were to be introduced to the heated soil under vacuum, the steam would become superheated and undesirable chemical interactions could take place. On the other hand, if liquid water were present with the contaminated soil (and it usually will be), the maximum temperature of the soil cannot rise above the temperature at which the vapor pressure of liquid water is equal to the total absolute pressure of the system. Thus, while maintaining a given vacuum, the maximum temperature of the soil mass will be maintained at ambient temperatures, i.e., below the normal boiling point of water at atmospheric pressure. By this means, any deleterious reactions of water and contaminants are effectively prevented when this process is operated in this manner. This all goes to say that water may be present in most contaminated soils being treated, but that steam should not be employed as a "sweeping gas" to aid this particular process.

In any event, regardless of the presence or absence of water in the earth material, at the conditions of temperature and pressure employed in the herein disclosed process, virtually all liquid contaminants, down to certain permissible levels hereinafter referred to as "maximum permissible residual concentration(s)" ("MPRC"), can be very rapidly volatilized at those temperature and pressure conditions determined to be suitable for conducting this process.

The resulting gaseous phase, containing contaminants condensable under certain process conditions (e.g., cooling) employed by this invention, as well as various innocuous condensibles and non-condensibles (e.g., inert gases such as nitrogen), is then drawn from the vacuum vessel through a chilling stage (e.g., through a condenser) thereby converting virtually all of the volatilized contaminants into a concentrated liquid phase suitable for lawful disposal and/or further use. Remaining trace quantities of such contaminants also may condense in recompression and cooling of a vacuum pump discharge system. These residual contaminants—if any there be—can then be recombined with the bulk of the contaminants obtained by the condenser. A portion of the inert gas (e.g., nitrogen) is most preferably recycled for use as the sweeping/stripping gas for the next batch of contaminated soil undergoing treatment.

Because of their chemical complexities and/or the ongoing nature of their chemical reactions, it would be virtually impossible to list every liquid (and hence "volatilizable") organic chemical contaminant to which this process might be applied. However, the organic compounds which are most likely to be present in contaminated soils are polychlorinated biphenyls (PCB's), other aromatics, pentachlorophenols (PCP's), other halogenated hydrocarbons, various solvents and certain pesticides such as lindane and aldrin. By way of further generalization, this process will be particularly effective in separating those liquid, halogenated compounds whose vapor pressures (at 5° C.) range from about 0.0000001 mm Hg to about 300 mm Hg.

The present invention is based on the rather surprising discovery that it is possible at certain hereinafter described pairs of temperature and pressure conditions to rapidly and effectively overcome certain levels of diminishing returns encountered by processes aimed at lowering contamination levels in soils being treated by heating processes carried out at temperatures below the 600° F. (315.5° C.) level mandated by federal regulations. Again, 600° F. is important because it is the temperature used to define "incineration" in certain federal regulations. Consequently, it is also the temperature at which use of certain specialized, complex and expensive air pollution control equipment is required.

Applicant recognizes (as did 942 patent) that the continuous volatilization of liquid compounds in their pure state is markedly affected when absorbed into soils. Indeed, the initial rapid evolution of contaminants as vapors abruptly slackens virtually to a standstill. Thereafter, it is nearly impossible to reduce contamination, even after hours of heating. This situation persists for many common contaminants, even at temperatures beyond those of "unlawful" incineration.

Applicant, however, has found that when contaminated soils are exposed to progressively more severe vacuum conditions, the critical level at which this slackening of volatilization rate takes place occurs at successively lower residual contamination levels in successively briefer periods of time. Finally, a value of high vacuum is reached (which applicant terms the "threshold" value of total pressure) which, when paired with a legally permissible temperature, achieves a reduction of residual level of contaminant concentration to a MPRC in so short a length of time that the initial rapid evaporation of the contaminant persists until the process has been carried out to satisfactory completion. Thus, applicant's findings would be surprising even in view of the previously noted observations made in the 942 patent and in the Paris, *Physical Chemists Handbook* reference about the existence of various "phases of volatilization". That is to say that none of the above noted references recognizes the phenomenon that certain liquid organic compounds will be evolved in the strikingly discontinuous manner as that shown in FIG. 1 of this patent disclosure. Moreover, nothing taught or suggested by the 942 patent or any other of the references noted above suggests that cleanup processes can be based upon the behavior of this striking discontinuity with high vacuum.

Applicant's process also can serve to drastically reduce the size of the equipment and the time required to cleanup or otherwise decontaminate earth materials contaminated by a wide variability of liquid organic compounds. This time reduction is so dramatic that it enables applicant's "batch" process—in spite of the materials handling drawbacks generally associated with batch processes—to decontaminate more soil per unit time than comparably "sized" processes, such as the one described in the 942, which seek to gain the materials handling advantages commonly associated with "continuous" processes. Furthermore, the herein disclosed process permits significant reductions in the physical size of applicant's process, vis-a-vis processes which depend on heat alone as the volatilizing force. Indeed, applicant's apparatus can be reduced in size to a point of true portability and mobility and thereby rendering the herein disclosed process practical for "small" and/or "remote" cleanup operations.

Laboratory testing of applicant's process, using bench scale equipment, demonstrated that various, organic compound contaminants can be removed from earth materials by heating such contaminated materials to temperatures below 600° F. (i.e., to temperatures below the point where certain regulatory definitions of "incineration" are applicable) under various degrees of "high" vacuum (i.e., from about 0.005 mm Hg to 400 mm Hg). In one test, for example, soil containing nearly 1000 ppm PCB's was heated at 570° F. at about 5 mm Hg and decontaminated to a MPRC level of 2 ppm in about one-half hour. Other tests established that temperature and pressure "pairs" of about 570° F., plus or minus 20° F., and 5 mm Hg, plus or minus 4 mm Hg, make particularly good pairs for removing many liquid contaminants and especially highly halogenated hydrocarbons such as PCB's. Other tests were performed in conjunction with the use of a "sweeping gas" atmosphere of nitrogen to further improve the overall efficacy of this process such that the period of time required to effect the desired degree of decontamination of an earth material was reduced to the time needed for loading the vessel, mass heating to temperature and unloading the decontaminated soil.

After loading and vessel sealing operations, applicant's process is commenced by heating the contaminated soil in a vessel which must be capable of holding a very high degree of vacuum under the 300–600° F. temperature conditions employed in this process. As a practical matter (e.g., because of ASME pressure vessel regulations), such vacuum vessels will be designed to withstand both at least 30 pounds per square inch of internal pressure as well as nominal full vacuum. Preferably, the heating means will be provided through a medium or device other than direct firing of the vessel, e.g., by electrical heating elements, use of DOW-THERM ® circuits, etc. Solids temperatures should, however, be carefully and uniformly maintained below 600° F. This requirement can be aided by inclusion and use of agitation or stirring devices for less mobile soils and/or larger capacity vessels. In most cases the contaminated soils will be heated to temperatures ranging from about 300° F. to less than about 600° F. Under each temperature condition for each vacuum level (ranging from about 0.005 mm Hg to about 400 mm Hg) a "critical point" will be observed at which the rate of reduction of the remaining contamination concentration abruptly diminishes. One such value of total pressure will have a borderline "threshold" value at which this critical point takes place just at a maximum permissible residual concentration (MPRC) for that given contaminant. For example, vacuum conditions of about 5 mm Hg (e.g., 5 mm Hg±4 mm Hg) at temperatures at about 570° F. (e.g., 570° F.±20° F.) were found to be particularly effective for removing PCB contaminants from soil to MPRC levels of 2 ppm or less. In any case, at certain combinations of values of MPRC, time, temperature and pressure, the least volatile component of a given contaminant or mixture of contaminants vaporizes into a gas phase, leaving behind an innocuous solid phase (i.e., decontaminated soil). The gaseous phase, which may contain steam, air and an inert sweeping gas such as nitrogen, as well as vaporized organic contaminants such as PCB's, is continuously drawn off from the vacuum vessel. The vaporized organic contaminants can then be readily condensed and collected for further treatment or disposal by appropriate procedures.

Figure 1:
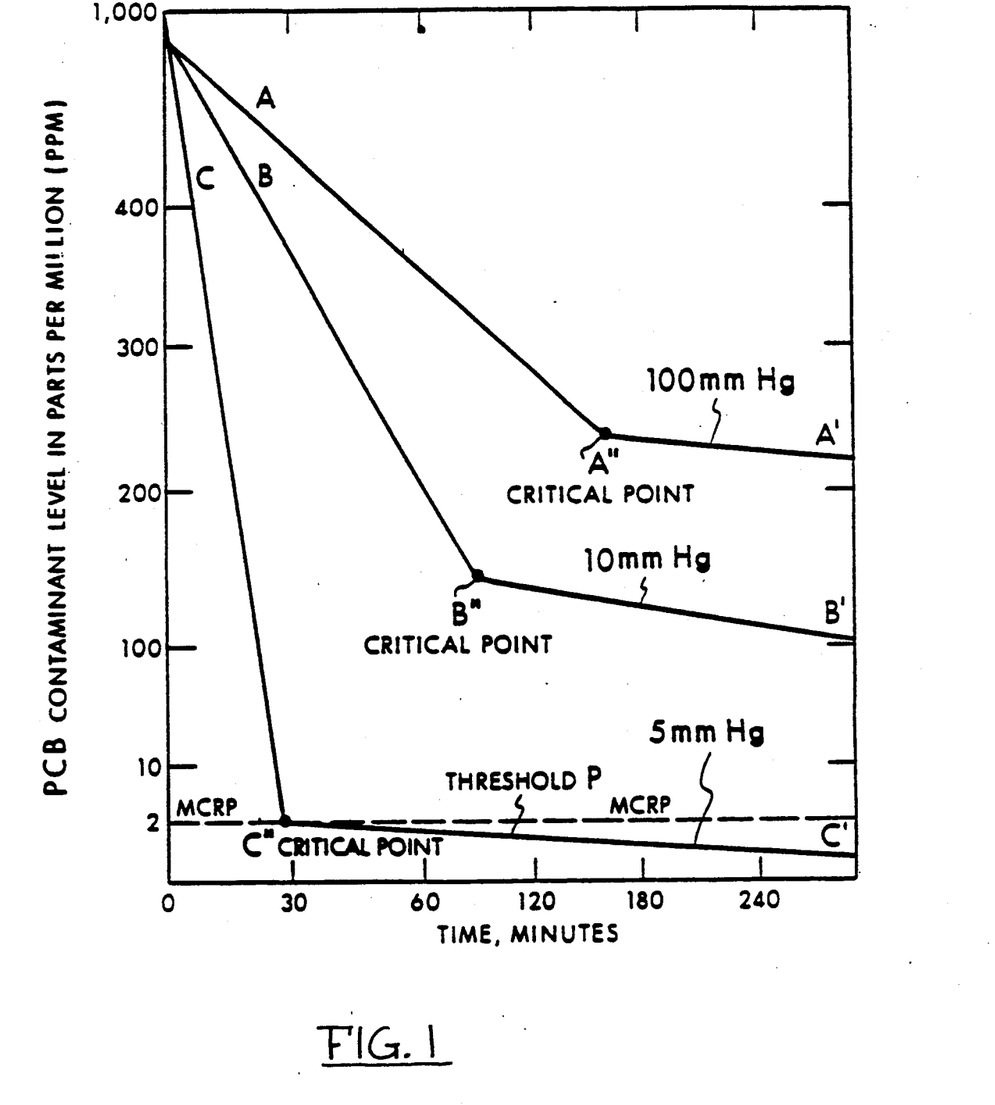
FIG. 1 represents the typical trend of behavior of applicant's process for removal of a given contaminant, at a fixed temperature, over a range of three values of total applied vacuum.

Referring to FIG. 1, which portrays graphically the phenomena described above, applicant has discovered that if the concentration of a liquid contaminant in a soil is observed during the course of its heating to some maximum temperature less than 600° F., it can be noted that the contaminant concentration level will be lowered, with time, until an "abrupt slackening" of the rate of gasification of said contaminant takes place. At higher vacuum levels, the rate of gasification improves; nevertheless, after a first brief period of rapid vaporization, there is an abrupt decline in this rate to a virtual standstill. For example, this behavior can be portrayed by curve A-A' in FIG. 1 of this patent disclosure. The abrupt slackening is observed as a "discontinuity" or sudden change to a much more shallow slope at some critical point (e.g., point A") on such a curve. On curve A-A', this critical would roughly corresponds to a contaminant concentration level of about 250 ppm at about 2.5 hours of process time. Thereafter, for all practical purposes, further reduction from this "unacceptable" level (i.e., it is greater than the mandated 2 ppm level) becomes impractical.

The level of total pressure depicted by each of the curves of FIG. 1 will be referred to as a "parametric value" of the pressure. For example, curve A-A' could depict the parametric value of 100 mm Hg. At a still greater vacuum level, another parametric value of pressure (e.g., 10 mm Hg) could produce another curve B-B' which has an analogous critical point B" at a lower, but still unacceptable, residual contaminant concentration of about 120 ppm at about 90 minutes of process time. That is to say that after about 90 minutes, under these conditions, further decontamination again becomes highly impractical. Finally, however, curve C-C' which depicts the results of using parametric value of total pressure of 5 mm Hg shows a rate of decline at the initial rapid rate which continues to some "acceptable" level (the MPRC level of 2 ppm) in about 30 minutes. That is to say that only then, at the MPRC level, does the evaporation rate undergo an abrupt slackening.

Again, the pressure which accomplishes this is, for purposes of this patent disclosure, referred to as the threshold value ("threshold value") of the total pressure parameter, which in this case is 5 mm Hg. In expressing this concept in perhaps more precise language, it could be said that each of the curves: A-A', B-B' and C-C' exhibit an increasing steep slope to lower levels of residual contamination, in shorter times, until finally a preferred "pair" of temperature and pressure operating conditions are imposed on the system such that, at a given temperature (e.g., the 570° F. temperature employed in producing the curves of FIG. 1), some threshold value of high vacuum (e.g., the 5 mm Hg employed in producing curve C-C' of FIG. 1) achieves some predetermined maximum permissible residual contamination (MPRC) level without any "appreciable slackening." That is to say there is no "abrupt change" of slope of a contamination vs. time curve (such as that of curve C-C') from an initial phase of "steepness" to a later phase of impractical "shallowness" until the MPRC level is attained. This slope of the parametric curves can be given the numerical value of the rate of change of the ordinate value (i.e., the residual concentration level of the contaminant in the soil) for a given short interval of time. In such case, it will be noted that this value of slope for curve A-A' is about 5 ppm per minute in the initial rapid evaporation phase. For curve B-B' the slope has an approximate initial rapid evaporation phase of about 10 ppm per minute. Again, for curve C-C', this rapid decontamination—to completion, as defined by attainment of the MPRC level—takes place without any "appreciable slackening" at a rate of about 33 ppm per minute.

Since it is this phenomenon that forms an important concept of the herein disclosed process, the expression "appreciable slackening" should be quantified and made the subject of an example. Such an example can be readily constructed by, for example, assuming: (1) an original level of contaminant concentration of say 905 ppm, (2) a maximum permissible residual concentration (MPRC) level of say 5 ppm and (3) and overall process time of 30 minutes until said MPRC level is finally reached. The average rate of change of the residual concentration level, with time, will be equal to 30 ppm per minute (i.e., (905 ppm−5 ppm) 30 minute. Applicant's more preferred methods for carrying out the herein disclosed soil decontamination processes will seek to limit any departure from the initial rate of change of a residual contaminate level vs. time curve, such as C-C' (and more precisely that portion of curve C-C' which extends from C to critical point C") to the final rate of change of such curve to some value of, say, not more than about 20% and in no case more than about 40%.

Thus, applicant would define expressions like "abrupt slackening", "sudden change to a much more shallow slope", "appreciable slackening", etc. to mean a limitation on any departure from the initial rate of change (i.e., that of line C-C") to the final rate of change, (i.e., that of line C"-C') to not more than 40%, and most preferably not more than 20%.

In the case of the 20% limitation, for example, these conditions can be met by an initial rate of about 33.3ppm in the first minute of operation, and a final rate of about 26.7 ppm in the 30th minute of operation. The overall average loss of contaminant therefore being about 30 ppm per minute with the total decline in rate being about 6.6 ppm (33.3 ppm−26.7 ppm) which is approximately equal to 20% of the initial 33.3 ppm rate.

Thus, from beginning to end, a particularly preferred embodiment of the herein disclosed process for separating a liquid contaminant which is volatilizable under a pair of temperature and pressure conditions which respectively fall within the temperature range from 300° F. to 600° F. and the pressure range from about 5 $\mu$Hg (i.e., 0.005 mm Hg) to about 400 mm Hg from an earth material contaminated by said liquid contaminant would comprise the process steps of: (1) loading an earth material contaminated by a liquid contaminant into a first vessel which is capable of withstanding high vacuum conditions therein; (2) subjecting the earth material contaminated with the liquid contaminant to a temperature greater than about 300° F., but less than 600° F.; (3) drawing a vacuum on the first vessel to a pressure of from about 5 $\mu$Hg to about 400 mm Hg, such that a pair of conditions of temperature and pressure are attained in the first vessel which cause the liquid contaminant to be evolved from the earth material by flashing to a contaminant vapor in a substantially continuous manner, such that a subsequent rate of change of a residual level of concentration of the liquid contaminant in said earth material with respect to time, does not decline from an initial rate of change of an original concentration of the liquid contaminant with respect to time, by more than about 40% until a predetermined maximum permissible residual concentration (MPRC) level for said liquid contaminant is attained, (4) withdrawing the contaminant vapor from the first vessel and transferring the contaminant vapor to a second vessel provided with means for condensing said vapor to a contaminant liquid and (5) transferring the contaminant liquid to a third vessel for disposal purposes.

The process can be augmented by various measures. Not the least of these will be the introduction of an inert gas into the first vessel in order to act as a "sweeping gas." That is to say that the inert gas should not be capable of chemically reacting with the vapors of the liquid contaminant which most preferably will "physically" evolve from the earth material without undergoing significant chemical reactions. Again, steam, and especially superheated steam, is not recommended as a sweeping gas for this process. Nitrogen, carbon dioxide, helium and/or argon are the most preferred inert gases for any gas sweeping operations (if indeed any are employed), used in conjunction with applicant's basic process. A minimum superficial gas velocity (typically 0.1 to 4.0 feet per second) should be maintained in the vacuum vessel to assure adequate vapor removal from the earth material being decontaminated.

Within these broad parameters, the specific operating parameters for any given cleanup task will vary depending on the degree of wetness of the earth material, the concentration and boiling point(s) of contaminant(s) in that earth material (which can vary over a wide range), and the percentage of the contaminants to be removed from said material. It also should be noted that applicant's process can be, and preferably is, carried out after any necessary preliminary drying step or stage is carried out in said vacuum vessel. Indeed, during a preliminary drying stage of operation, temperatures will remain at the boiling point of the aqueous liquid phase for the degree of vacuum then prevailing, regardless of the rate of heat addition. That this constitutes one of the more important virtues of applicant's process can be appreciated when one stops to consider that this phenomenon effectively prevents adverse chemical interactions between contaminants and water, purely by reason of the unfavorable kinetics of such chemical reactions at essentially ambient temperatures.

It also should be noted that applicant's process may be operated to remove virtually all liquid, organic and/or liquid inorganic compounds and to render the treated soil environmentally safe by all present EPA standards; or the process may be carried out to other levels determined for other technical and/or personal requirements. For example, as is shown in FIG. 1, PCB levels can be reduced to levels less than the 2 ppm regulatory requirement for PCB's. Consequently, temperatures, pressures, and residence times may vary greatly within the prescribed temperature and pressure conditions. Again, however, the maximum average solids temperature should never exceed 600° F. regardless of any other variations in the herein disclosed process. Curve C-C' of FIG. 2 graphically illustrates that the operating conditions of about 570° F. at 5 mm Hg, are particularly effective in reducing contamination levels of PCB's to less than 2 ppm in particularly short residence times, e.g., in about 30 minutes.

Those skilled in this art will also appreciate that other analogous "pairs" of temperature and vacuum conditions can be employed to "emulate" certain preferred process conditions such as those defined by say 570° F. and 5 mm Hg. Optimum residence times and economics of equipment sizes and utilities consumption will, of course, also be important considerations. One possibly overriding circumstance will be found at the maximum capacity of the vacuum pump and its driver horsepower. Obviously, while the earth materials can be held at the herein disclosed process conditions for long periods of time if desired, the discontinuities shown in the curves of FIG. 1 show that increases in residence times will needlessly reduce the throughput capacity of the system and, hence, the relative effectiveness of this "batch" process vis-a-vis "continuous feed" processes such as the one disclosed in the 942 patent.

Another advantage of this process—aside from the time it saves relative to other comparably sized cleanup processes—is that it is characterized by the fact that none of the contaminating compounds (e.g., halogenated compounds such as PCB's) are ever subjected to temperatures above 600° F. Hence, they will not undergo undesirable chemical reaction to even more noxious compounds. For example, there will be no incidental creation of dioxin from halogenated hydrocarbons by use of this process. It should also be noted that the presence of dioxin in a contaminated soil will not disturb the operational effectiveness of the herein disclosed process nor the environmental "cleanliness" achieved.

The apparatus which is capable of carrying out this process can be mounted on a conveniently moveable, wheeled, platform, for location at a site contiguous to the contaminated soil location with convenient power/fuel utilities facilities. Obviously such an apparatus could be mounted or a barge or boat for marine cleanup operations. Such apparatus will most preferably incorporate the following major pieces of functioning equipment: (1) a pressure vessel capable of withstanding full vacuum provided with a manway for introduction of soil, a second manway for removal and disposition of "clean" soil, a suitable internal material mixer-agitator (optional), a nozzle for introduction of sweep gas, a nozzle for removal of sweep gas plus the condensable volatile materials removed from the contaminated soil, various other fittings and accessories incorporated for convenience of the operator, (2) a suitable condenser for the vapors e.g., a device called a heat exchanger with multiple tubes passing through a chamber to carry coolant and equipped with connections for introduction and removal of coolant, which becomes heated in the course of passing through the condensing vessel while rendering liquid most of the condensable portions of vessel 1 gases and (3) suitable vacuum pump device and especially one that draws a vacuum on the vacuum vessel via the condenser.

Some additional preferred methods for conducting this process, and further features and advantages of the present invention, will be made more apparent from the following drawings, experimental results and illustrative examples. Those skilled in this art will, of course, appreciate that the apparatus, operating conditions and/or procedures hereinafter given may be varied without departing from the basic principles and spirit of the present invention. That is to say that the following drawings, examples and discussions should be considered as illustrations of, and not restrictions upon, this invention.

BRIEF DESCRIPTION OF THE DRAWINGS

The objects and advantages of this invention can be more clearly understood when they are considered in conjunction with the accompanying drawings which should be considered as a most important part of this patent disclosure.

DESCRIPTION OF PREFERRED EMBODIMENTS

FIG. 1 is entitled "Residual PCB Levels vs. Process Time". It indicates that a set of curves, such as those depicted in FIG. 1, can be established at any given, suitable, temperature value (e.g., 570° F.). It also illustrates the fact that a family of curves for the volatilization of a given contaminant species (e.g., PCB's) can be established for various parametric values of total absolute pressure at a given single value of temperature. Such a family of curves also can be established for any contaminant species at any suitable value of temperature being considered (e.g., for PCB's at temperatures less than 600° F. such as 300°, 400°, 500° F., etc.). Such curves can also be established for various mixtures of organic compounds and/or inorganic compounds, having at least one chemical species capable of being volatilized under the temperature and pressure conditions employed in processes carried out according to this patent disclosure. It should also be noted in passing that some species of contaminants, such as PCB's for example, are comprised of mixtures of various PCB homologus molecules. For example, a PCB's basic biphenyl structure can have from 1 to 10 chlorine substitutions in 128 different isomeric arrangements. Consequently, those skilled in this art will appreciate that the curves shown in FIG. 1 depict the volatilization of the least volatile (i.e., most highly chlorine substituted) PCB homologue which exists in the contaminating PCB liquid. Similarly, such parametric curves for any contaminant mixture would depict the concentration of the least volatile homologue contained in the mixture of contaminants for any selected temperature (when such temperature is fixed at some value such as 570° F.), for a given least volatile contaminant homologue (e.g., the PCB homologue which has 10 chlorine substituents) for any desirable range of a "set" of parametric values of total pressure (e.g., the 100 mm Hg, 10 mm Hg, and 5 mm Hg "set" shown in FIG. 1. That is to say, such phenomena might generally exist for any contaminant comprised of a mixture of homologous molecules, but PCB's make an especially good representative illustration of the general point because the various molecules which make up the PCB can have 1, 2, 3 . . . or 10 chlorine atom substituents. In any event, the effects of changes in such pressures can be portrayed as a family of curves, each representing the effects of a different pressure. Thus, for example, curve A-A' depicts the lowering of the concentration of the least volatile PCB homologue species at the temperature and pressure conditions of 570° F. and 100 mm Hg. Similarly, curve B-B' depicts the lowering of such PCB concentrations at 570° F. and 10 mm Hg (i.e., the same temperature but a "stronger" vacuum). Note that the critical point A" of curve A-A' corresponds to a PCB concentration of about 240 ppm and takes about 150 minutes to reach. Note also that increased process times (e.g., up to 240 minutes), using the conditions depicted in curve A-A', only succeed in lowering the PCB concentration to about 220 ppm. Similarly, the critical point B" of curve B-B' corresponds to a PCB concentration of about 150 ppm—which is achieved in about 90 minutes. That is to say that at higher and higher vacuums, each such parametric curve exhibits a changing negative slope of parts per million vs. time. Such a point of abrupt slope reduction (or "discontinuity") should be considered for the purposes of this patent disclosure to be a "critical point" (e.g., points A", B", and C" in FIG. 1) of temperature and pressure corresponding to a level of contaminant reduction, in a given length of time, beyond which further reduction can be accomplished only with vastly greater elapsations of time.

Thus, given a maximum permissible residual concentration (MPRC) for a given contaminant (e.g., 2 ppm for PCB's), it will be observed that this particular "critical point" is reached at a value of the pressure parameter (e.g., 5 mm Hg) for a given temperature (e.g., 570° F.). In other words, this "critical point" value can fall above or below a given concentration level (e.g., above or below 2 ppm). Again, the critical point B" for curve B-B' is located at a PCB concentration level of about 150 ppm (and hence above the 2 ppm level mandated by federal regulations) while the critical point C" for curve C-C' is located at a PCB concentration which lies at the line 2-2' which corresponds to the MPRC, 2 ppm "cleanup level" required by certain federal regulations.

These curves also help to explain why volatilization processes which employ temperatures below 600° F. at atmospheric or nearly atmospheric pressures (e.g., the 0.1 to 2.0 inches of water vacuum conditions employed by the process of the 942 patent), tend to take two to twenty times longer to reach certain MPRC levels such as the 2 ppm level indicated by line 2-2' of FIG. 1. Indeed, some of applicant's experimental work carried out near the mandated upper limit of 600° F. (e.g., a series of experiments conducted at about 590° F. and much lower vacuum conditions) indicated that concentration levels for certain particularly "high boiling point" contaminant liquid mixtures could only reach 2 ppm levels, if at all, in process times of 24 hours or more.

Again, FIG. 1 represents only a small sample of certain results obtained by applicant's experimental program. That is to say FIG. 1 seeks only to depict certain results of using the herein disclosed process on a soil contaminated only with PCB's, using a 570° F. temperature level. Contamination level vs. time curves A-A' and B-B' were based upon calculations. Curve C-C' is, however, based on carefully derived experimental data. That is to say that curve C-C', for the reasons previously noted with respect to the discussion of "relative volatilities") represents actual "threshold" data for decachloro-biphenyl the "least volatile" of the PCB homologues. These curves are given in the same figure (FIG. 1) in order to portray the existence of, and location of, certain "critical points" in said curves vis-a-vis certain MPRC levels. Similar curves can of course be established for PCB contaminated soils using various other representative temperatures, e.g., 300° F., 400° F., 500° F, etc. up to temperatures approaching the 600° F. legal limit.

Other organic compound contaminants were used in similar testing programs as were contaminants comprised of very complex mixtures of different chemical compounds. This work all served to confirm that virtually any liquid (and hence "vaporizable") contaminant compound, or mixture of such contaminant compounds (and especially those liquid organic compounds having vapor pressures (at 5° C.) between about 0.0000001 and about 300 mm Hg), can be quickly (e.g., in about 30 minutes or less) removed from a earth material such as a soil, sludge or sediment, by use of process conditions which have a "pair" of temperature and process parameters such that the temperature parameter of the pair falls between about 300° F. and 600° F. and the pressure parameter of the pair falls between about 400 mm Hg and about 0.005 mm Hg. Actually, applicant would expect that threshold pressure requirements of less than about 2 microns Hg might be encountered for certain contaminants, but the costs and complexities of achieving such high levels of vacuum, especially with portable equipment, quickly escalate. Generally, excellent results can be obtained for all but highly non-volatile, and thus less noxious contaminants, by use of vacuum levels in the range of about 2 mm Hg to about 10 mm Hg (and most preferably at about 5 mm Hg)—vacuum conditions—which can be achieved with modest equipment and moderate operating costs.

It also should be mentioned that ebullition (i.e., actual boiling rather than surface evaporation) occurs for a "pure" liquid when the total pressure of the system equals the vapor pressure of the material. This relationship, in general, is linear for the logarithm of vapor pressure as a function of reciprocal absolute temperatures below 95% of critical. It has been exhibited throughout nature and has been observed many times for countless pure materials. Contaminated soil, on the other hand, is a mixture of liquid and solid phases, rather than a pure liquid and exhibits anomalous departures from normal patterns of liquid evaporation. Again, certain of these anomalies were noted in previous discussions of the teachings of the 942 patent. Applicant's invention can be differentialed from the teachings of the 942 patent in that it invokes the dimension of severe vacuum conditions in order to utilize certain other kinds of anomalous behavior which can be employed to greatly promote the depth and speed of decontamination. Specifically, this invention is based upon applicant's finding that the effective partial pressures of contaminants, when absorbed on earth materials such as soil, sediment, sludge, etc., does not necessarily conform to the vapor pressure relationship linearly, with mole fraction of contaminants at various temperature and pressure conditions viz. temperatures ranging from 300°–600° F., when high vacuum conditions are also extant. That is to say that the applicant has found that there are certain abrupt changes of the molecular fraction relationship between partial pressure and vapor pressure in the mixed liquid solid phases. This phenomenon may have various possible explanations, e.g., weak chemical bonding, chemical absorption on active lattice sites of soil structure, etc., but all such explanations are—to some degree—conjectural. Nonetheless it is this phenomenon—taking place for whatever reason(s)—that forms the basis of the means and methods herein disclosed which enable the herein disclosed process to achieve a rapid, practical and lawful reduction of noxious soil contaminants from earth materials by a relatively small, readily transportable piece of equipement.

Figure 2:
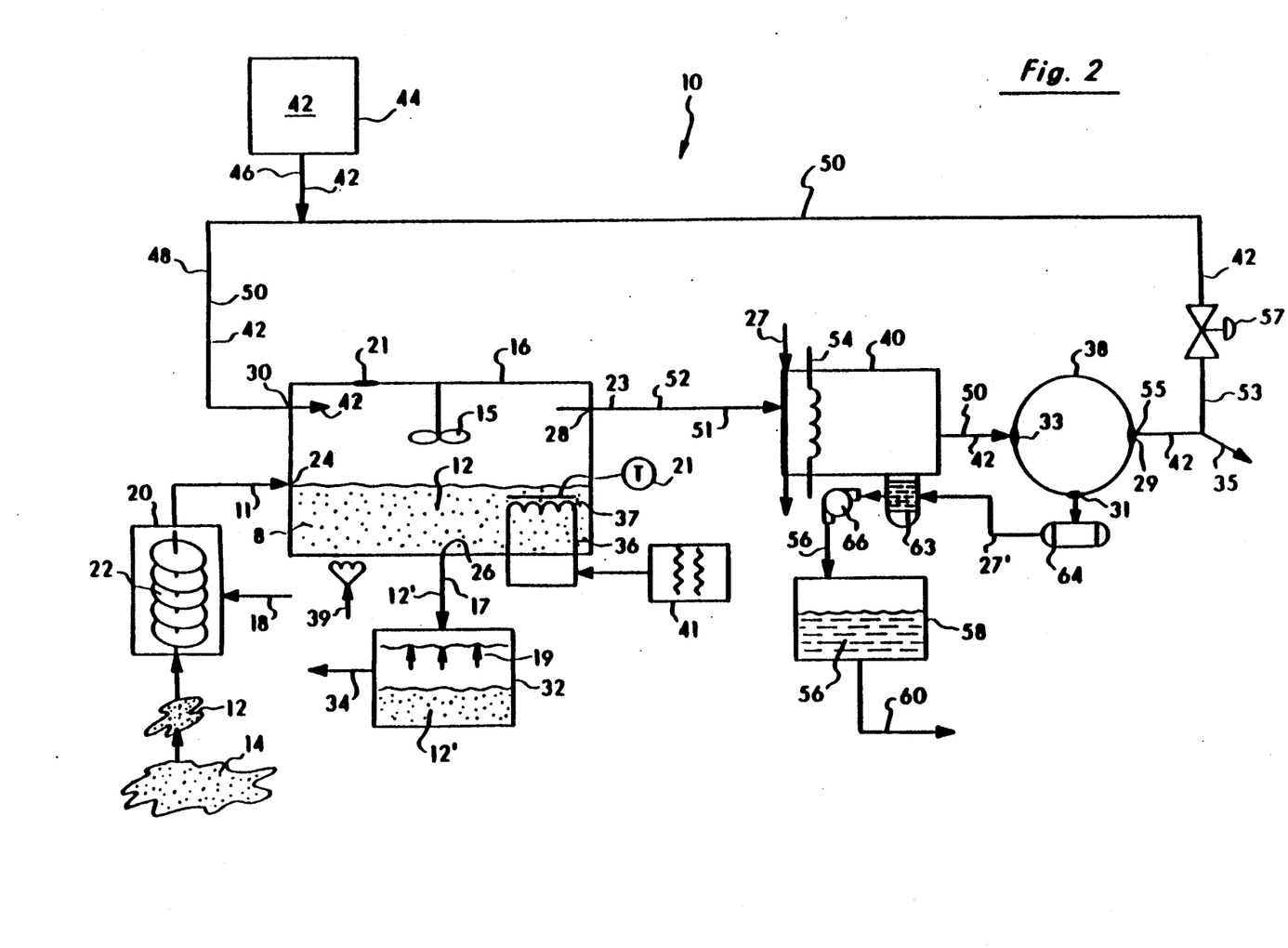
FIG. 2 represents a flow diagram of one particularly preferred embodiment of the herein disclosed process.

FIG. 2 is given to show how applicant's process may be mechanically arranged in order to process suitable quantities of contaminated soil (e.g., from 10 to 500 tons per day) by an apparatus having a "batch" capacity of from about 1 ton to about 25 tons. The process depicted in FIG. 2 can be based upon certain assumed equipment specifications and/or operating conditions. A most generalized version of applicant's apparatus (that is to say an apparatus capable of "drying" a wet solid by the use of heat and sweeping gases, etc.) can be found in Perry's Chemical Engineers Handbook, 5th Ed., pages 20-46, and the text thereof is incorporated herein by reference herein. That is to say that once having determined the threshold pressure for the MCRP of a given least volatilized contaminant, at some maximum permissible condition of temperature, it remains to design an apparatus which is specifically designed to achieve the desired process conditions.

To this end, FIG. 2 depicts a generalized apparatus 10 for carrying out applicant's particular decontamination process. The major components of the apparatus 10 depicted in FIG. 2 are all intended to be mounted as an operating unit on one or more conveniently moveable (e.g., wheeled) platform(s) (e.g., a truck trailer bed) for contiguous location at a work site on or near the contaminated soil. Obviously, utilities (fuel/power, etc.) will also be needed. The decontamination process itself begins when a conveniently sized portion of contaminated soil 12 is taken from a "local" body of contaminated soil 14 and loaded into a vacuum vessel 16, preferably equipped with a suitable internal mixer 15 which, among other things, is capable of holding nominal full vacuum at those temperature conditions (e.g., 300° to 600° F.) at which the herein disclosed decontamination process must be carried out. The vacuum vessel 16 of course must be capable of withstanding those external pressures generally associated with nominal absolute vacuum conditions under the maximum temperature conditions employed. However, as an optional step, the sized portion of the contaminated soil 12 may be subjected to various physical measures (debris removal, grinding, sizing, etc.) and ingredient additions (e.g., the introduction of various additional ingredients 18, other than the contaminated soil, e.g., lime, ash, water, decontaminated soil, etc.) which are generally depicted by the presence of a soil preconditioning device 20 located in front of the material inlet side 11 of vacuum vessel 16.

Any additional ingredients 18 added to the contaminated soil 12 should, however, be further characterized by their inability to chemically react to any significant degree with the soil contaminants, (e.g., with liquid, halogenated compounds) under the temperature and pressure conditions employed in this process. For example, any decontaminated soil 12' added to the contaminated soil 12 loaded into the vessel for, say, adjustment of the moisture content of the contaminated soil 12, will not normally contribute to the formation of any potentially hazardous substances. However, those skilled in this art will be aware that other seemingly innocuous substances, such as water for example, may in fact contribute to the formation of certain noxious and/or toxic substances such as furans under such conditions. In one preferred embodiment the heating of the soil is carried out in the absence of air. However, preconditioning steps carried out in preconditioning device 20 will not generally include predrying the contaminated soil. If water is present in the contaminated soil 12, its removal will most preferably be accomplished by other measures hereinafter more fully described.

The screw device 22 shown in preconditioning device 20 generally represents all of the many devices which constitute a loading mechanism employed to feed contaminated soil 12 into the vacuum vessel 16. All openings in the vacuum vessel, e.g., its contaminated soil loading port 24, its decontaminated soil exit port 26, its vapor exit port 28, and its inert gas entry port 30 must be capable of holding the high vacuum conditions which exist in vacuum vessel 16 during the decontamination step of this process. Decontaminated soil 12' is preferably transferred from the bottom of the vessel 16 to a container 32 for subsequent disposition generally indicated by arrow 34. Use of such decontaminated soil 12' to replace the local body of contaminated soil 14 is of course the most straightforward method of disposing of said decontaminated soil 12'. That is to say that this process is fully capable of producing soils having a state of cleanliness suitable for the immediate restoration of that soil to the cleanup site. Portions of the decontaminated soil 12' also may be used to adjust the moisture content of any incoming contaminated soil :o about to be introduced into vacuum vessel 16.

In any event, after the vacuum vessel 16 is charged with a suitable portion of contaminated soil 12 it is sealed to withstand the vacuum conditions to be employed and heated by a heater means 36 capable of both predrying the contaminated soil at the only slightly elevated temperatures associated with the vacuum conditions prevailing and decontaminating the soil. In a preferred embodiment of this process the contaminated soil 12 in the vessel 16 is heated in a second step or phase of the process to a temperature of from about 300° F. to a temperature of 600° F.; preferably such temperatures are imparted to the soil 12 in a time period of less than about two hours, and more preferably in a time period of less than about one-half hour. The heater means 36 may act directly on the contaminated soil 12 (e.g., and most preferably, by use of an electrical heater element 37 placed inside the vacuum vessel 16) or it may be an internal pipe coil bearing a liquid heating fluid circulated from an external heated reservoir 41 vessel 16. In either case, however, the heater means will be controlled to supply sufficient heat to carry out the herein disclosed process at some desired rate such as the 30 minute period suggested by curve C-C' of FIG. 1. The heater means 36 may also be made responsive to a heat sensing means 21 which is capable of adjusting the heater means 36 and hence the temperature of contaminated soil to some prescribed temperature (e.g., 570° F.). Such heat sensing means 21 may be employed to maintain the average temperature of the soil in such a way as to prevent any localized overheating inherent in operation of heater element 36 so that the maximum temperature can be maintained at some desired level below the 600° F. level mandated by federal regulations regarding "incineration". Generally speaking the decontaminated soils 12' will be removed from the vacuum vessel 16 at lower temperatures which may be achieved through application of cooling sprays 19 which can be added to the decontaminated soil 12' as it is removed from vacuum vessel 16.

A vacuum level of between about 2 μHg to about 400 mm Hg can be provided to vacuum vessel 16 (via lines 50 and 51) by a vacuum pump 38. In one highly preferred embodiment of the herein disclosed decontamination process, the vacuum pump 38 evacuates the atmosphere of the vacuum vessel 16 via a condenser device 40 used to condense vapors of the contaminant liquid which are volatilized in vacuum vessel 16 under the temperature and pressure conditions which exist therein.

Such vacuum conditions can be applied while the contaminated soil 12 is being heated or it can be applied after the contaminated soil has attained a given temperature. For example, it can be applied after the soil has been heated to a temperature (e.g., 120° F.) which drives off one component (e.g., water) but before other contaminants (e.g., PCB's) are driven off and thereby preventing certain chemical reactions (e.g., the formation of furans) from taking place. Thus, water vapor can be evacuated from vessel before any appreciable amounts of, say, highly halogenated compound(s) are driven off the soil by the saturation conditions which serve to volatilize water. The conditions represented by say 212° F. and 1 atmosphere of pressure can of course be "imitated" by another set of atmospheric conditions characterized by lower temperatures and pressures (e.g., 120° F. and 88 mm Hg). Again, however, as a practical matter, applicants have found that any water associated with the contaminated soil is most preferably removed by first raising the soil's temperature to about 120° F., and then evacuating the resulting water vapor before creating the temperature and pressure conditions in vessel 16 which are calculated to volatilize the targeted liquid halogenated compounds which contaminate the soil 12. In any event, and regardless of whether the vacuum is applied before or after some desired temperature is reached, the volatile components of the contaminant(s) will eventually and finally be vaporized.

As indicated in FIG. 2, any vapors evolved during this decontamination process are carried out of vacuum vessel 16 by means of piping 51 connected to vapor outlet 28. Piping system 48 can introduce a recirculating stripping gas into the vessel 16 via throttle valve 57 and inert gas inlet nozzle 30 at the inlet side of vessel 16. In any case, the resulting total flow of gases in the vessel 16 will be in the direction of vacuum pump 38.

As previously noted, nitrogen is exemplified as the stripping gas used to assist in carrying away evolved vapors from the contaminated soil 12, although it will be understood that the present invention may employ any nonreactive stripping gas capable of lowering the partial pressure of the organic vapor component in the vacuum vessel 16 so that vaporization of organic materials may occur more readily. Such a stripping gas should also be noncondensable under the conditions prevailing in condenser 40.

The gas phase which leaves the vessel 16 may be comprised of air, steam, volatilized organic materials including halogenated organic materials, and fine solid particles. This gas phase can be continuously drawn out of the vessel 16 or drawn in distinct process steps (e.g., after a given temperature is reached). In either case, this gas phase passes from vessel 16 through piping 51 to condenser 40. Depending on the amount of fines introduced into the gas phase by the contaminated soil 12, it may be desirable to treat this gas phase by passing it through an optional intermediate mechanical fines collection device (not shown in FIG. 2) for removal of entrained fine particulate materials. In any event, the treated or untreated gases are then conveyed via pipe 51 to condenser 40. Condensation occurs as the temperature of the gas is cooled to a saturation/condensation point of liquids contained therein.

That is to say vacuum vessel 16 is connected to a suitable condenser device 40 equipped with suitable internals for circulating coolant in thermal communication with the off gas stream 23 from the vacuum vessel 16 while preserving the chemical integrity of both the coolant stream 27 and the off gas stream 23 withdrawn from vessel 16. Such a cooling device is commonly called a "heat exchanger" and it is generally characterized by its possession of multiple tubes which pass through a heat exchange chamber. The ends of tubes are physically separated by a tube sheet, baffle and channel arrangement equipment well known to the art. Such a condenser 40 can also be equipped with connections for controlling introduction and removal of coolant stream 27 which becomes heated in the course of passing through said condenser 40.

The vacuum pump 38 also may be provided with a large nozzle 29 for moving noncondensible gases under vacuum and a smaller bottom nozzle 31 equipped on a boot 63 with liquid level control for accumulating and draining all materials condensed by the cooling action provided by the condenser 40. The vacuum vessel 16 is preferably connected via condenser 40 to a vaccum pump 38 which is sized to match expected noncondensable gas handling quantities anticipated in any given operation. The vacuum pump 38 will be equipped with suitable mechanical or electrical drive means, as desired, to provide the vapor pumping power required for the size of the operation. The vacuum pump 38 also will have an inlet nozzle 33 sized to handle the anticipated noncondensible gas volumes introduced at the maximum vacuum conditions anticipated. It may also be provided with a discharge means 35 for handling any anticipated noncondensible gas volumes, at a pressure conveniently higher than atmospheric, for full rejection to the atmosphere when necessary.

The vacuum pump discharge 31 may also be provided with a small auxiliary vessel 64 delivering, by level control, small amounts of additional condensate 62 occurring as a result of compression and cooling. Such a vacuum pump system also can be provided with a branch 53, on its discharge connection side 55, equipped with a back pressure controlling throttle valve 57 for holding nominal discharge pressure from the vacuum pump 38, upstream, and at the same time delivering downstream, at vacuum conditions, desirable quantities of inert gas 42 back to the vacuum vessel 16 for use as a stripping gas.

A reservoir tank 44 for holding as required, make-up supplies of inert gas 42, e.g., nitrogen, $CO_2$, etc. is also a most convenient, optional, additional component to this system as are fuel reserve tanks (not shown) for holding quantities of fuel needed to drive the mechanical devices needed to produce the 300°-600° F. temperatures and vacuum conditions needed for the herein disclosed process. Again, however, in one particularly preferred embodiment of this invention, such heat is provided by an electrical heating element 37 for direct electrical heating of the contaminated soil mass in vacuum vessel 16.

Be that as it may, the resulting inert gas/halogenated compound vapor mixture 52 is drawn from vessel 16 and transferred to condenser 40. As previously noted, condenser 40 is provided with a cooling circuit 54 which serves to cool the inert gas/halogenated compound vapor mixture. This cooling causes the bulk of the contaminant vapors, e.g., halogenated compound vapors and/or other contaminants, to condense to the liquid state and accumulate in a condenser boot 63. The condenser boot 63 also receives any further condensate resulting from recompression in vacuum pump 38 via discharge drain 31. In any case, the resulting contaminant liquid 56 from condenser 40 is drawn from the condenser boot 63 via condensate pump 66 and transferred to a storage vessel 58 for subsequent disposal by appropriate means generally indicated by arrow 60. Obviously, if the appropriate means of disposal is incineration at some distant licensed incineration facility, only the volume of the liquid contaminant must be transported—and not the volume of the contaminated soil.

As was previously noted, the inert gas should be noncondensible at the conditions which exist in the vacuum pump discharge. Hence, said inert gas 42 can be "separated" from the vapors of the contaminating compound with which it was previously mixed. Again, the resulting contaminant compound condensate 56 is then drawn from cooler 40 and vacuum pump vessel 64 and sent to a collection tank 58. Any separated water fraction also may be drawn from the collection tank 58 by means of pump 72 and may be pumped, for example, to water collection tanks, or drained directly if sufficiently uncontaminated.

The system 10 should be capable of accepting feed in the form of a dry soil, a pumpable sludge or non-pumpable sludges or solids, but the feed, most preferably, should contain no particles larger than about 1.25 inches in diameter. The feed may typically be comprised of from 10 to 50% water, from 10 ppm to 10 weight percent halogenated organic contaminants, and 30 to 90% inert solids (soils), and as a typical example may be comprised of about 30% water, 5% mixed organics, and 65% soil, but constitution varies greatly depending on the particular treatment site. In the following description of operation of the system, wet contaminated soil is fed on a "batchwise basis" at a rate of about 15 tons/hr of soil on a dry basis, 2.25 tons/hr of water/hr, 0.015 tons per "batch" of hydrocarbons, and about 1-20 pounds per hour of nitrogen gas introduced at a temperature of about 0 to 40 degrees C.

Variations on the design or operation of the above illustrative embodiments may be readily made to adapt the inventive process to various operational demands, all of which are within the scope and spirit of the present invention. Consequently, it is to be understood that various modifications and substitutions, as well as rearrangements and combinations of vessels, tanks, apparatus, and/or process steps, can be made by those skilled in the art without departing from the spirit and scope of this invention.

Thus having described this invention, what is claimed is:

1. A process for separating a liquid contaminant, which is volatilizable under a pair of temperature and pressure conditions respectively falling within a temperature range from about 300° F. to 600° F. and a pressure range from about 0.005 Hg to about 400 mm Hg, from an earth material contaminated by said liquid contaminant, said process comprising:

(a) loading an earth material contaminated by the liquid contaminant into a vacuum vessel defining a first vessel;

(b) subjecting the earth material contaminated by the liquid contaminant to a temperature greater than about 300° F., but less than 600° F.;

(c) drawing a vacuum on the first vessel to a pressure of from about 0.005 mm Hg to about 400 mm Hg such that a pair of conditions of temperature and pressure are reached which causes the liquid contaminant to evolve from the earth material by flashing to a contaminant vapor to such an extent that a maximum permissible residual concentration level of said liquid contaminant in said earth material is substantially attained and thereby producing a decontaminated earth material;

(d) withdrawing the contaminant vapor from the first vessel by vacuum pump means and transferring said contaminant vapor to a second vessel provided with means for condensing said vapor to a contaminant liquid;

(e) transferring the contaminant liquid from the second vessel to a third vessel for disposal purposes; and (f) removing the decontaminated soil from the first vessel.

2. The process of claim which further comprises introducing an inert gas into the first vessel in order to serve as a sweeping gas.

3. The process of claim 1 which further comprises introducing an inert gas selected from the group consisting of nitrogen, carbon dioxide, helium and argon into the first vessel in order to serve as a sweeping gas and wherein the process is carried out in the substantial absence of air.

4. The process of claim 1 wherein the liquid contaminant is an inorganic compound.

5. The process of claim 1 wherein the liquid contaminant is an organic compound.

6. The process of claim 1 wherein the liquid contaminant is a halogenated organic compound.

7. The process of claim 1 wherein the liquid contaminant is a mixture of organic compounds.

8. The process of claim 1 wherein the liquid contaminant is a PCB.

9. The process of claim 1 wherein the temperature is about 570° F. (±20° F.) and the pressure is about 5 mm Hg (±4 mm Hg).

10. The process of claim 1 wherein the temperature is about 570° F. (±20° F.) and the pressure is about 5 mm Hg (±4 mm Hg) and the liquid contaminant is a halogenated organic compound.

11. The process of claim 1 wherein the temperature is about 570° F. and the pressure is about 5 mm Hg and the liquid contaminant is a PCB.

12. The process of claim 1 wherein the maximum permissible residual concentration of the liquid contaminant is two parts per million.

13. The process of claim 1 which further comprises adjusting the temperature and pressure in the vacuum vessel sequentially so as to first drive water vapor from the contaminated earth material before the contaminated earth material is subjected to the pair of conditions of temperature and pressure which cause the liquid contaminants, other than water, to evolve from said earth material.

14. The process of claim 1 wherein a stripping gas is employed in the first vessel and recycled back to said first vessel via a stripping gas recycle circuit.

15. The process of claim 1 wherein a preheated stripper gas is employed.

16. The process of claim 1 wherein the contaminated earth material is heated by an electrical heater.

17. The process of claim wherein the contaminated soil is heated by a heater fluid system.

18. A process for separating a liquid contaminant, which is volatilizable under a pair of temperature and pressure conditions respectively falling within a temperature range from about 300° F. to 600° F. and a pressure range from about 0.005 mm Hg to about 400 mm Hg, from an earth material contaminated by said liquid contaminant, said process comprising:
   (a) loading an earth material contaminated by the liquid contaminant into a vacuum vessel defining a first vessel;
   (b) heating the earth material contaminated by the liquid contaminant to a temperature greater than abut 300° F., but less than 600° F.;
   (c) drawing a vacuum on the first vessel to a pressure of from about 0.005 mm Hg to about 400 mm Hg, such that a pair of conditions of temperature and pressure are attained in the first vessel which cause the liquid contaminant to be evolved from the earth material by flashing to a contaminant vapor in a substantially continuous manner, such that a rate of change of a concentration of the liquid contaminant in said earth material, with time, does not decline from an initial rate of change of an original concentration of the liquid contaminant, with time, by more than about 40% until a predetermined maximum permissible residual concentration (MPRC) level for said liquid contaminant is attained in said earth material;
   (d) withdrawing the contaminant vapor from the first vessel by vacuum pump means and transferring said contaminant vapor to a second vessel provided with means for condensing said vapor to a contaminant liquid;
   (e) transferring the contaminant liquid from the second vessel to a third vessel for disposal purposes; and
   (f) removing the decontaminated soil from the first vessel.

19. The process of claim 18 which further comprises introducing an inert gas into the first vessel in order to serve as a sweeping gas.

20. The process of claim 18 which further comprises introducing an inert gas selected from the group consisting of nitrogen, carbon dioxide, helium and argon into the first vessel in order to serve as a sweeping gas and wherein the process is carried out in the substantial absence of air.

21. The process of claim 18 wherein the liquid contaminant is an inorganic compound.

22. The process of claim 18 wherein the liquid contaminant is an organic compound.

23. The process of claim 18 wherein the liquid contaminant is a halogenated organic compound.

24. The process of claim 18 wherein the liquid contaminant is a mixture of organic compounds.

25. The process of claim 18 wherein the liquid contaminant is a PCB.

26. The process of claim 18 wherein the temperature is about 570° F. (±20° F.) and the pressure is about 5 mm Hg (±4 mm Hg).

27. The process of claim 18 wherein the temperature is about 570° F. (±20° F.) and the pressure is about 5 mm Hg (±4 mm Hg) and the liquid contaminant is a halogenated organic compound.

28. The process of claim 18 wherein the temperature is about 570° F. and the pressure is about 5 mm Hg and the liquid contaminant is a PCB.

29. The process of claim 18 wherein the maximum permissible residual concentration of the liquid contaminant is 2 parts per million.

30. The process of claim 18 which further comprises adjusting the temperature and pressure in the vacuum vessel sequentially so as to first drive water vapor from the contaminated earth material before the contaminated earth material is subjected to the pair of conditions of temperature and pressure which cause the liquid contaminants, other than water, to evolve from said earth material.

31. The process of claim 18 wherein a stripping gas is employed in the first vessel and recycled back to said first vessel via a stripping gas recycle circuit.

32. The process of claim 18 wherein a preheated stripper gas is employed.

33. The process of claim 18 wherein the contaminated earth material is heated by an electrical heater.

34. The process of claim 18 wherein the contaminated soil is heated by a DOWTHERM ® system.

35. An apparatus for separating a liquid contaminant, which is volatilizable under a pair of temperature and pressure conditions which respectively fall within a temperature range from about 300° F. to 600° F. and a pressure range from about 0.005 Hg to about 400 mm Hg, from an earth material contaminated by said liquid contaminant, said apparatus comprising:
   (a) a first vessel which is capable of holding a high degree of vacuum and further comprising an earth material inlet port, an earth material outlet port and a contaminant vapor outlet port and heater means capable of heating the earth material contaminated by the liquid contaminant to a temperature of from 300° F. to 600° F. in less than about an hour;
   (b) means for driving the heater means to a temperature between about 300° F. and 600° F.;
   (c) means for sensing the temperature inside the first vessel;
   (d) means responsive to said means for sensing the temperature inside the first vessel and adjusting said temperature to a prescribed level;
   (e) vacuum pump means which is connected to the first vessel and which is capable of producing vacuum levels of from 0.005 mm Hg to about 400 mm Hg in said first vessel and drawing contaminate vapors produced in said first vessel into a condenser system;
   (f) a condenser system, connected to the contaminate vapor outlet port of the first vessel, capable of condensing the contaminate vapors produced in the first vessel to a liquid condensate; and
   (g) liquid condensate collection system connected to said condenser system for collecting and conveying liquid condensate to a condensate storage vessel.

36. The apparatus of claim 35 wherein the first vessel further comprises a stripping gas inlet port and apparatus for supplying a stripping gas.

37. The apparatus of claim 35 wherein the first vessel further comprises a stripping gas inlet port and apparatus for supplying a stripping gas and a stripping gas recycling system having means for taking stripping gas from a downstream outlet in the vacuum pump means and delivering said stripping gas back to the first vessel.

38. The apparatus of claim 35, mounted on one or more platforms and thereby made transportable by a vehicle.

39. The apparatus of claim 35 which further comprises means for preheating a stripper gas which is to be introduced into the first vessel.

40. The apparatus of claim 35 wherein the heater means is an electrical heater.

41. The apparatus of claim 35 wherein the heater means is heated by a DOWTHERM ® system.

42. The apparatus of claim 35 wherein the first vessel further comprises a soil agitation means located inside said first vessel to prevent local overheating of the contaminated soil.

* * * * *

UNITED STATES PATENT AND TRADEMARK OFFICE
CERTIFICATE OF CORRECTION

PATENT NO.   : 5,103,578
DATED        : Apr. 14, 1992
INVENTOR(S)  : Robert S. Rickard It is certified that error appears in the above-indentified patent and that said Letters Patent is hereby corrected as shown below:

Column 16, line 30, "Soil :o" should read --soil 12--

Column 20, line 28, "claim" should read --claim 1--

Signed and Sealed this

Twelfth Day of April, 1994

*Attest:*

BRUCE LEHMAN

*Attesting Officer*

Commissioner of Patents and Trademarks

UNITED STATES PATENT AND TRADEMARK OFFICE
CERTIFICATE OF CORRECTION

PATENT NO.: 5,103,578

DATED: April 14, 1992

INVENTOR(S): Robert S. Rickard

Page 1 of 3

It is certified that error appears in the above-identified patent and that said Letters Patent is hereby corrected as shown below:

| Col. | Line | |
|---|---|---|
| 2 | 35 | "expense" should read --expense,-- |
| 4 | 7 | "rather than eddy" should read --rather than eddy,-- |
| 7 | 8 | "process, vis-a-vis" should read --process vis-a-vis-- |
| 8 | 29 | "critical would" should read --critical point would-- |
| 8 | 47 | "using parametric" should read --using a parametric-- |
| 11 | 53-54 | "soil, various" should read --soil and various-- |
| 11 | 62 | "vessel 1 gases" should read --vessel gases-- |
| 12 | 61 | "FIG. 1." should read --FIG. 1).-- |

UNITED STATES PATENT AND TRADEMARK OFFICE
CERTIFICATE OF CORRECTION

PATENT NO.: 5,103,578

DATED: April 14, 1992

INVENTOR(S): Robert S. Rickard

It is certified that error appears in the above-identified patent and that said Letters Patent is hereby corrected as shown below:

| Col. | Line | |
|------|------|---|
| 13 | 64 | "curve C-C', for the reasons" should read --curve C-C' (for the reasons-- |
| 14 | 49 | "differentialed" should read --differentiated-- |
| 16 | 30 | "soil :o" should read --soil 12-- |
| 16 | 50 | "reservoir 41 vessel 16." should read --reservoir vessel 41.-- |
| 21 | 8 | "claim" should read --claim 1-- |
| 21 | 23 | "abut" should read --about-- |

UNITED STATES PATENT AND TRADEMARK OFFICE
CERTIFICATE OF CORRECTION

PATENT NO.: 5,103,578

DATED: April 14, 1992

INVENTOR(S): Robert S. Rickard

It is certified that error appears in the above-identified patent and that said Letters Patent is hereby corrected as shown below:

| Col. | Line | | | |
|------|------|---|---|---|
| 22 | 30 | "DOWTHERM ®" | should read | --(heater fluid)-- |
| 24 | 7 | "DOWTHERM ®" | should read | --(fluid heater)-- |

Signed and Sealed this

Twentieth Day of September, 1994

Attest:

BRUCE LEHMAN

Attesting Officer

Commissioner of Patents and Trademarks